US012019448B1

(12) United States Patent
Gupta et al.

(10) Patent No.: US 12,019,448 B1
(45) Date of Patent: Jun. 25, 2024

(54) MAPPING AND DETECTION FOR SAFE NAVIGATION

(71) Applicant: PlusAI, Inc., Santa Clara, CA (US)

(72) Inventors: Mayank Gupta, Mountain View, CA (US); Anurag Ganguli, Saratoga, CA (US); Timothy Patrick Daly, Jr., San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/195,329

(22) Filed: May 9, 2023

(51) Int. Cl.
| | |
|---|---|
| *G05D 1/02* | (2020.01) |
| *B60W 50/14* | (2020.01) |
| *G01C 21/00* | (2006.01) |
| *G01C 21/30* | (2006.01) |
| *G05D 1/00* | (2006.01) |
| *G06T 7/13* | (2017.01) |
| *G06T 7/50* | (2017.01) |
| *G06V 20/58* | (2022.01) |

(52) U.S. Cl.
CPC ............ *G05D 1/0214* (2013.01); *B60W 50/14* (2013.01); *G01C 21/3804* (2020.08); *G06T 7/13* (2017.01); *G06T 7/50* (2017.01); *G06V 20/58* (2022.01)

(58) Field of Classification Search
CPC . G05D 1/0214; B60W 50/14; G01C 21/3804; G06T 7/13; G06T 7/50; G06V 20/58
See application file for complete search history.

(56) References Cited

U.S. PATENT DOCUMENTS

| | | | |
|---|---|---|---|
| 2013/0103305 A1* | 4/2013 | Becker | G01C 21/3453 701/410 |
| 2017/0124476 A1* | 5/2017 | Levinson | G06V 20/58 |
| 2018/0188045 A1* | 7/2018 | Wheeler | G06F 18/22 |
| 2019/0095725 A1* | 3/2019 | Kalghatgi | G06V 20/59 |
| 2021/0041887 A1* | 2/2021 | Whitman | G05D 1/0274 |

FOREIGN PATENT DOCUMENTS

WO   WO-2022033089 A1 *  2/2022

\* cited by examiner

*Primary Examiner* — Nga X Nguyen
(74) *Attorney, Agent, or Firm* — Sheppard Mullin Richter & Hampton LLP

(57) ABSTRACT

Methods, systems, and non-transitory computer-readable media are configured to perform operations comprising determining map data and detection data for an area in an environment; determining a change in the area based on the map data and the detection data; and generating control data based on the change.

20 Claims, 10 Drawing Sheets

ABSTRACT# MAPPING AND DETECTION FOR SAFE NAVIGATION

FIELD OF THE INVENTION

The present technology relates to autonomous systems. More particularly, the present technology relates to mapping and detection functionality in autonomous systems.

BACKGROUND

An autonomous system for navigation of a vehicle can plan and control motion for the vehicle. The planning and control functions of the autonomous system rely on data about the vehicle and an environment in which the vehicle is travelling, including the position and movement of other vehicles and objects. The performance of the planning and control functions can depend on such data as the state of the vehicle and the conditions of the environment change. The performance of these functions can be especially challenging in different situations. As one example, a vehicle, such as a truck, that is travelling on a road toward an overpass or other overhead obstacle should properly account for the overhead obstacle in view of the height of the vehicle to avoid a collision.

SUMMARY

Various embodiments of the present technology can include methods, systems, and non-transitory computer readable media configured to perform operations comprising determining map data and detection data for an area in an environment; determining a change in the area based on the map data and the detection data; and generating control data based on the change.

In some embodiments, the operations further comprise estimating measurements for a structure or an object in the area based on the detection data, wherein the control data is based on the measurements for the structure or the object.

In some embodiments, the estimating comprises determining edges of the structure or the object based on visual data for the structure or the object; and determining a distance between the edges of the structure or the object based on depth data for the structure or the object.

In some embodiments, the operations further comprise projecting the map data over the detection data; and comparing the map data and the detection data, wherein the change in the area is determined based on the comparing.

In some embodiments, the operations further comprise providing the detection data for the area, wherein the map data for the area is updated based on the detection data.

In some embodiments, the operations further comprise determining a first point on an edge of a structure in the area; determining a second point on a road surface in the area, wherein the second point is vertically below the first point; determining a first distance associated with the first point, a second distance associated with the second point, and an angle associated with the first point and the second point; and estimating a clearance below the structure in the area based on the first distance, the second distance, and the angle, wherein the control data is generated based on the clearance.

In some embodiments, the operations further comprise providing an alert based on the change in the area.

In some embodiments, the operations further comprise determining whether estimated measurements for a structure or an object in the environment are converging to a value, wherein the control data is generated based on whether the estimated measurements are converging.

In some embodiments, the map data includes at least one of: a three-dimensional (3D) reconstruction of the area, a point cloud of the area, images of the area, and semantic information for the area.

In some embodiments, the control data includes data to perform at least one of: a reroute of a vehicle, a safe stop of a vehicle, a maneuver to avoid navigation under a structure or an object, a reduction in speed, and a maneuver to navigate a vehicle away from a point of interest.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
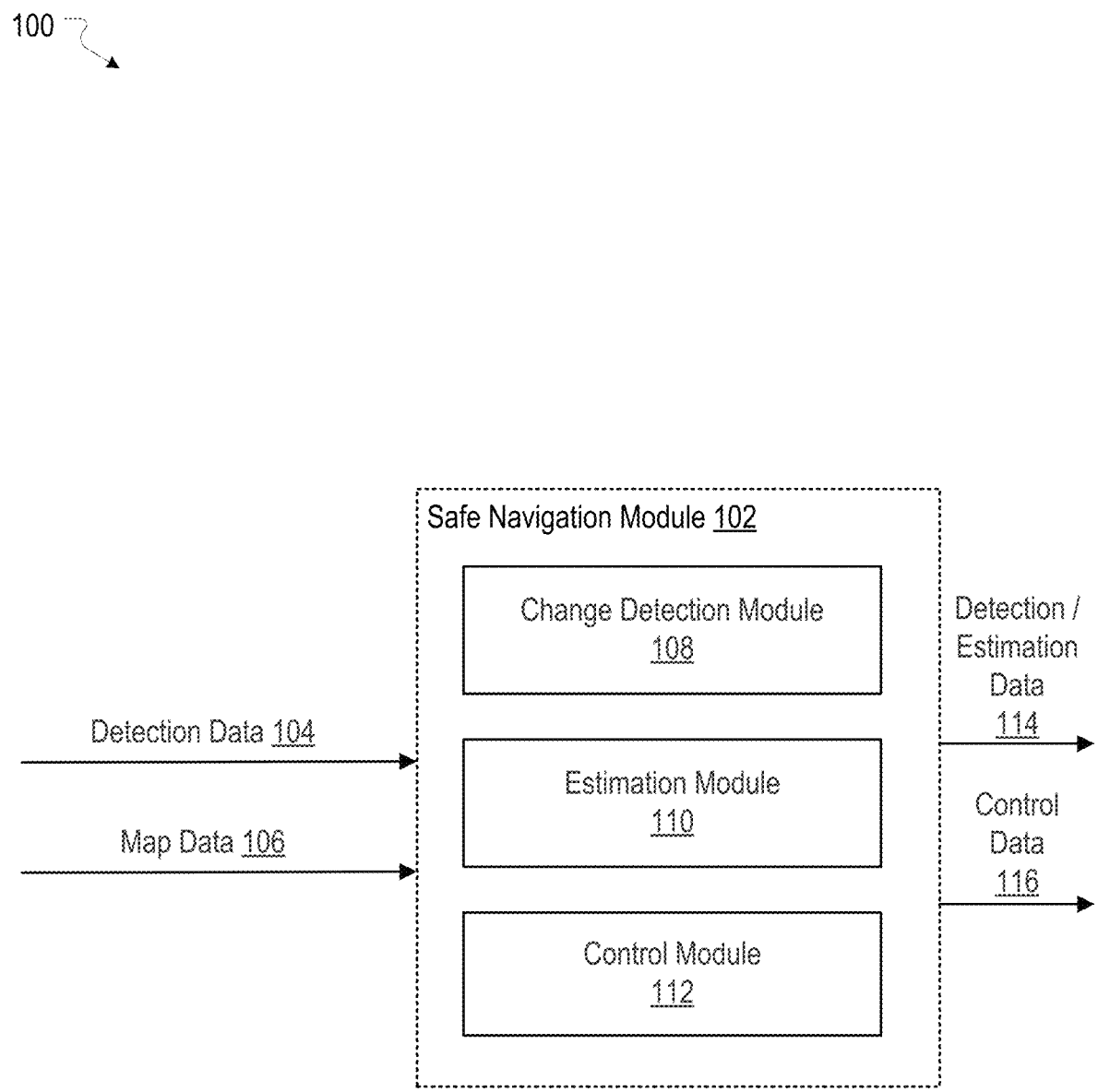
FIG. 1 illustrates an example system associated with mapping and detection for safe navigation, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Mapping and Detection for Safe Navigation

An autonomous system for navigation of a vehicle can plan and control motion for the vehicle. The planning and control functions of the autonomous system rely on data about the vehicle and an environment in which the vehicle is travelling, including the position and movement of other vehicles and objects. The performance of the planning and control functions can depend on such data as the state of the vehicle and the conditions of the environment change.

Understanding an environment in which a vehicle having an autonomous system for navigation (e.g., ego vehicle) is travelling is fundamental to planning and control functions of the vehicle. For example, a truck travelling in an environment can plan a safe route to travel in the environment based on an understanding of the environment. An understanding of an environment can involve detecting obstacles such as other vehicles, pedestrians, traffic signals, objects, etc. The understanding of the environment can be supported by a map of the environment. For example, the map of the environment can provide information about the environment to facilitate planning of a safe route through the environment. An autonomous system for navigation of a vehicle can plan and control motion of the vehicle based on the map and in response to the identified obstacles.

However, under conventional approaches, navigation of a vehicle based on use of a map and detection of obstacles poses various technological challenges. In some cases, a map may provide insufficient information, provide inaccurate information, or become inaccurate over time. For example, an autonomous system of a vehicle can attempt to navigate a highway that goes under an overpass. Based on information in a map of the highway, the autonomous system can determine that the overpass is of sufficient height for the vehicle to safely travel under the overpass. However, the environment in which the overpass is located may have changed since map information was last collected. For example, the highway may have been repaved, reducing the amount of space under the overpass and rendering the information in the map of the highway inaccurate. Because the information in the map of the highway was rendered inaccurate by the recent repaving of the highway, the autonomous system may fail to safely navigate the vehicle under the overpass. Further, in some cases, an autonomous system of a vehicle may not be configured to detect certain obstacles or the vehicle may be travelling too fast for the autonomous system to accurately detect obstacles. For example, an autonomous system of a vehicle can navigate a highway that goes under an overpass. The autonomous system of the vehicle may not be configured to detect the height of the overpass. Because the autonomous system of the vehicle is not configured to detect the height of the overpass, the autonomous system relies on information in a map to determine whether the height of the overpass, or the clearance under the overpass, is sufficient for the vehicle to safely navigate under the overpass. If, for example, the highway has been repaved since information in the map was collected, then the information in the map can be inaccurate. Because the information in the map can be inaccurate and the autonomous system is not configured to detect the height of the overpass, the autonomous system may fail to safely navigate the vehicle under the overpass. Thus, conventional approaches of autonomous systems for navigation face various challenges with respect to use of maps and detection of obstacles.

The present technology provides improved approaches for navigation of a vehicle that overcome the aforementioned and other technological challenges. In various embodiments, the present technology provides for mapping points of interest in an environment. A point of interest can be an area in an environment where changes in the area can potentially impact or inform effective navigation of the area. For example, a point of interest can be an area including a bridge, an area including an overpass, an area including an overpass sign, an area including an overhanging tree, an area including a blind turn, or the like. A map for navigation of an environment can include information for a point of interest in the environment at a higher level of detail than for other areas in the environment. For example, a map of an environment with a highway can include a point of interest for an area of the highway that has an overpass. The map can include information for the point of interest, such as a high density point cloud of the overpass, high resolution images of the overpass, semantic information related to the height of the overpass, and other types of information about the point of interest. For other areas in the environment, the map can include information at a lower level of detail. In various embodiments, the present technology can detect changes in an environment based on a map. A change in an environment can be detected based on a comparison between information in the map and detection data associated with the environment. The detection data associated with the environment can include, for example, sensor data captured at the environment. For example, the information in the map can be projected or overlaid on the detection data. A change in the environment can be detected based on differences between the information in the map and the detection data. Navigation of a vehicle in the environment can be controlled based on the detected change. For example, the vehicle can reduce speed to allow for more sensor data to be captured at the environment. As another example, a route of the vehicle can be changed to avoid an area where a change is detected. The map can be automatically updated based on the detection data.

As an example, an autonomous system of a vehicle can navigate the vehicle through an environment that includes a highway with an overpass. The autonomous system can navigate the vehicle through the environment based on a map of the environment. The map can include information for an area in the environment with the overpass as a point of interest. As the autonomous system navigates the vehicle on the highway towards the overpass, the autonomous system can compare detection data with information in the map for the point of interest. In this example, a sign may have recently been hung over the side of the overpass, reducing the clearance below the overpass. The autonomous system can compare the detection data with the information in the map for the point of interest. As a result of the comparison, the sign can be detected as a change in the environment. Based on the detected change, the autonomous system can reduce speed of the vehicle so that the clearance under the overpass can be accurately estimated. Based on estimates of the clearance, the autonomous system can determine that the clearance is insufficient to safely navigate the vehicle under the overpass. The autonomous system accordingly can route the vehicle to navigate off the highway to avoid the overpass. The autonomous system can provide the detection data captured at the environment, such as the clearance under the overpass, to automatically update the map. The updated map, for example, can be used later by an autonomous system of another vehicle to safely navigate the environment. As illustrated in this example, use of a map with points of interest, detection of changes in an environment based on the map, and navigation of a vehicle based on the detected changes allow the vehicle to safely navigate in situations where a change in the environment can potentially pose significant risk. Thus, the present technology provides improved approaches for safe and effective navigation of a vehicle. These and other inventive features and related advantages of the various embodiments of the present technology are discussed in more detail herein.

FIG. 1 illustrates an example system 100 including a safe navigation module 102, according to some embodiments of the present technology. In some embodiments, the safe navigation module 102 can provide support for various functions of an autonomous system of navigation of any type of vehicle (or ego vehicle), such as a truck. The safe navigation module 102 can generate detection/estimation data 114 and control data 116. The detection/estimation data 114 can include, for example, detection data captured at an environment and estimations made based on the detection data. The control data 116 can include, for example, controls for navigation of a vehicle. The safe navigation module 102 can support or be implemented as part of a planning function of an autonomous system of a vehicle, such as a prediction and planning module 616 of an autonomous system 610 of FIG. 6, as discussed in more detail below. Alternatively or additionally, the safe navigation module 102 can support or be implemented as part of a perception function of an autonomous system of a vehicle, such as a perception module 612 of the autonomous system 610 of FIG. 6, as discussed in more detail below. The safe navigation module 102 can generate the detection/estimation data 114 and the control data 116 based on various data, such as detection data 104 and map data 106, which are discussed in more detail below.

In some embodiments, some or all of the functionality performed by the safe navigation module 102 may be performed by one or more computing systems implemented in a vehicle. In some embodiments, some or all of the functionality performed by the safe navigation module 102 may be performed by one or more backend computing systems (e.g., remote from a vehicle). In some embodiments, some or all of the functionality performed by the safe navigation module 102 may be performed by one or more computing systems associated with (e.g., carried by) one or more users riding in a vehicle. In some embodiments, some or all data processed and/or stored by the safe navigation module 102 can be stored in a data store (e.g., local to the safe navigation module 102) or other storage system (e.g., cloud storage remote from safe navigation module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the safe navigation module 102 can be implemented in any suitable combinations. Functionalities of the safe navigation module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The safe navigation module 102 can include a change detection module 108. The change detection module 108 can detect changes in an environment based on detection data (detection data 104) and map data (map data 106). In general, detection data can include sensor data (e.g., camera data, LiDAR data, radar data, GPS data, IMU data, etc.) captured by various sensors. The detection data can include objects identified in the sensor data based on, for example, various object recognition technologies. The detection data can include text recognized in the sensor data based on, for example, various text recognition technologies. The detection data can be used by an autonomous system of a vehicle to understand an environment. Map data for an environment can include a high definition map (HD map) of the environment. The HD map can include information such as road shape, road markings, traffic signs, road barriers, and the like. The HD map can be generated based on sensor data captured at the environment. For example, vehicles can be directed to capture sensor data at the environment. The HD map for the environment can be generated based on the sensor data captured by the vehicles. The map data for the environment can include information for points of interest in the environment. A point of interest in the environment can be an area in the environment where changes in the area can impact navigation of the area. A point of interest can include, for example, an area with a bridge, an area with an overpass, an area with an overpass sign, an area with an overhanging tree, an area with a blind turn, and the like. The information for the points of interest associated with map data can include dense three-dimensional (3D) reconstructions of the area based on sensor data. The 3D reconstructions can include high density point clouds of the area based on LiDAR data. In addition, the 3D reconstructions can include high resolution images of the area based on camera data. The 3D reconstructions also can include semantic information describing shape, size, and type of objects in the area. The 3D reconstructions can include, for example, models of structures and road surfaces of the area. The map data for the environment can be updated as additional sensor data is captured at the environment. For example, a high density point cloud for a point of interest in the environment can be updated with LiDAR data to add additional points to the high density point cloud or remove or modify inaccurate points in the high density point cloud. High resolution images for the point of interest can be updated with camera data to add new high resolution images or replace inaccurate high resolution images. Semantic information for the point of interest can be updated based on, for example, the LiDAR data and camera data.

The change detection module 108 can detect, or determine, changes in an environment based on a comparison of detection data with map data. The comparison of the detection data with the map data can be based on a projection of the map data as a template over the detection data. Differences between the map data and the detection data can be evaluated to determine whether the environment has changed. In some cases, a change can be detected based on differences between the detection data and an HD map associated with the map data. For example, changes in road shape, road markings, traffic signs, road barriers, and other environmental features can be detected based on differences between the detection data and the HD map. In some cases, map data that includes more information at a higher level of detail for points of interest in an environment allows more changes in the points of interest to be detected.

For example, LiDAR data in the detection data can be compared with a point cloud in the map data. A change can be detected based on points in the LiDAR data exceeding or satisfying a threshold distance from corresponding points in the point cloud. As another example, camera data in the detection data can be compared with images in the map data. A change can be detected based on disparity values between pixels in the camera data and corresponding pixels in the images exceeding or satisfying a threshold disparity value. In addition, a change can be detected based on objects identified in the detection data being different from objects described in semantic information in the map data. For example, a change can be detected based on text recognized in the detection data being different from text described in the semantic information in the map data.

As an illustration, an autonomous system of a vehicle can navigate the vehicle in an environment including a highway and an overpass sign extending over the highway. The autonomous system can navigate the vehicle in the environment using map data and detection data for the environment. The area in the environment including the highway and the overpass sign can be a point of interest in the map data. For the point of interest, the map data can include a dense 3D reconstruction of the area. The dense 3D reconstruction can include a high density point cloud of the highway and the overpass sign; high resolution images of the highway and the overpass sign; and, semantic information describing the height, width, and shape of the overpass sign, clearance under the overpass sign, and text on the overpass sign. In this example, the overpass sign has recently been replaced with a new overpass sign that is larger than the old overpass sign. As the autonomous system of the vehicle navigates the vehicle to the highway and the new overpass sign, the autonomous system can compare the map data, which includes information for the old overpass sign, with the detection data, which is captured for the new overpass sign. The autonomous system can detect a change based on the comparison. For example, the autonomous system can detect a change in size between the old overpass sign and the new overpass sign based on a comparison of LiDAR data in the detection data captured for the new overpass sign with the high density point cloud of the old overpass sign. As another example, the autonomous system can detect a change in appearance between the old overpass sign and the new overpass sign based on a comparison of camera data in the detection data captured for the new overpass sign with the high resolution images of the old overpass sign. Further, the autonomous system can detect a change in text between the old overpass sign and the new overpass sign based on a comparison of recognized text in the detection data captured for the new overpass sign and the text in the semantic information for the old overpass sign. By detecting the changes to the overpass sign, the autonomous system can safely navigate the vehicle to avoid a potential collision based on the clearance under the new overpass sign being less than the clearance under the old overpass sign. Further, the map data can be updated with the features of the new overpass sign and related clearance.

The safe navigation module 102 can include an estimation module 110. The estimation module 110 can estimate measurements of structures and objects in an environment based on detection data. The measurements can be estimated based on sensor data in the detection data. The estimation module 110 can determine edges of the structures and the objects in the environment based on a variety of techniques. For example, edges of the structures and the objects in the environment can be determined based on camera data or other types of data. In some cases, the edges can be determined based on a comparison of pixel values of neighboring or adjacent pixels in the camera data. The edges can be determined to be where the neighboring pixel values have a difference that exceeds or satisfies a threshold pixel value difference. As another example, edges of the structures and the objects in the environment can be determined based on images of the structures and the objects in map data. The images of the structures and the objects can be associated with semantic information that identifies the edges of the structures and the objects in the images. The images of the structures and the objects in the map data can be projected, or overlaid, on to the camera data. The images of the structures and the objects in the map data can be aligned with the structures and the objects depicted in the camera data, for example, through a best fit approach. Based on the semantic information in the map data, the edges of the structures and the objects depicted in the camera data can be determined from the edges of the structures and the objects in the images. In yet another example, an object recognition model can determine semantic information, such as edges of structures and objects depicted in camera data. The object recognition model can be applied to the camera data to determine the edges of the structures and the objects. The foregoing are merely examples, and many variations are possible.

The estimation module 110 can estimate measurements of structures and objects based on their edges and LiDAR data (or other types of depth data) associated with the edges. For an edge of a structure or an object, the estimation module 110 can determine points in a point cloud that correspond with a laser transmitted by a LiDAR sensor that was reflected back by the structure or the object. The estimation module 110 can determine points in empty space in the point cloud that correspond with a laser transmitted by the LiDAR sensor that was not reflected back. The edge of the structure or the object in the point cloud can be determined to be between the points in the point cloud and the points in the empty space in the point cloud. Based on the edge of the structure or the object in the point cloud, a distance from the LiDAR sensor to a point on the edge of the structure or the object, a vertical angle of the point relative to the LiDAR sensor, and a horizontal angle of the point relative to the LiDAR sensor can be determined. Based on the distance, the vertical angle, and the horizontal angle determined for the point on the edge of the structure or the object, measurements, such as height and width, can be estimated for the structure or the object. For example, the height or the width of a structure or an object can be determined based on the distance between two edges of the structure or the object. The distance between the two edges can be determined based on distances to points on each edge from a LiDAR sensor, vertical angles of the points relative to the LiDAR sensor, and horizontal angles of the points relative to the LiDAR sensor. For example, an angle between a line from a LiDAR sensor to a first point on a first edge and a line from the LiDAR sensor to a second point on a second edge of a structure or an object can be determined based on the vertical angle and the horizontal angle of the first point relative to the LiDAR sensor and the vertical angle and the horizontal angle of the second point relative to the LiDAR sensor. Based on the angle between the line from the LiDAR sensor to the first point on the first edge and the line from the LiDAR sensor to the second point on the second edge, the distance to the first point on the first edge, and the distance to the second point on the second edge, a distance between the first point on the first edge and the second point on the second edge, which can be the distance between the first edge and the second edge, can be calculated.

The estimation module 110 can estimate clearance or a height under a structure or an object, such as an overpass or an overpass sign. A bottom edge of a structure or an object can be determined. For a point on the bottom edge of the structure or the object, a point on a road surface that is vertically below the point on the bottom edge can be determined. An angle between a line from the LiDAR sensor to the point on the bottom edge of the structure and a line from the LiDAR sensor to the point on the road surface can be determined based on, for example, a horizontal angle and a vertical angle associated with the point on the bottom edge of the structure relative to the LiDAR sensor and a horizontal angle and a vertical angle associated with the point on the road surface relative to the LiDAR sensor. The distance between the point on the bottom edge of the structure and the point on the road surface can be determined based on the distance to the point on the bottom edge of the structure from the LiDAR sensor, the distance to the point on the road surface from the LiDAR sensor, and the angle between a line from the LiDAR sensor to the point on the bottom edge of the structure and a line from the LiDAR sensor to the point on the road surface. The distance between the point on the bottom edge of the structure and the point on the road surface can be the clearance, or height, under the structure. In some cases, a point cloud may not include a point directly on an edge of a structure or an object. In these cases, the estimation module 110 can use a point outside the structure or the object but within a threshold distance of the edge. By using a point outside the structure or the object, the distance will be estimated to be less than the actual distance. The techniques described herein can be applied to determine space around a structure or an object, such as space between two structures or two objects. For example, a space between two structures can be determined based on a distance between an edge of a first structure and an edge of a second structure.

Sensor data, including sensor data used to estimate a clearance or height under a structure or an object, can be captured by a vehicle at a selected frequency. Reducing speed in an environment can allow more sensor data to be captured at the environment. Capturing more sensor data at the environment can facilitate better estimation of measurements of structures and objects in the environment, such as clearance or height. The estimation module 110 can estimate measurements for structures and objects in an environment for each set of sensor data captured. The estimation module 110 can determine whether the estimated measurements are converging to a value. The converging of the estimated measurements to the value can indicate that the estimated measurements are accurate. A failure of the estimated measurements to converge to a value can indicate a need to reduce speed further to capture more sensor data or indicate that conditions (e.g., weather conditions) are unsuitable for capture of accurate sensor data. Accordingly, when the estimated measurements are not converging, the estimation module 110 can cause the vehicle to reduce speed to obtain more sensor data and to allow for convergence where conditions allow.

As an illustration, an autonomous system of a vehicle can navigate the vehicle in an environment with a highway and an overpass. As the autonomous system of the vehicle navigates the vehicle toward the highway and the overpass, the autonomous system can detect a change in an area including the overpass. In this example, the highway under the overpass has been recently repaved and thereby elevated in height, reducing clearance under the overpass. Based on the detected change, the autonomous system can estimate measurements of the overpass. Edges of the overpass can be determined based on camera data capturing the overpass. Measurements of the overpass can be estimated based on the edges and LiDAR data associated with the overpass. In this example, the autonomous system can estimate a clearance under the overpass by estimating distances between points on a bottom edge of the overpass and points on the highway vertically below the points on the bottom edge of the overpass. The distances can be estimated based on distances between the points on the bottom edge of the overpass and a LiDAR sensor of the autonomous system, distances between the points on the highway and the LiDAR sensor, and angles between lines from the LiDAR sensor to the points on the bottom edge of the overpass and points on the highway. Based on the distances, the autonomous system can estimate the clearance under the overpass. If the clearance, for example, is less than a height of the vehicle or a trailer towed by the vehicle, then the autonomous system can respond appropriately to navigate the vehicle to avoid going under the overpass. In addition, the detected change in clearance relating to the overpass can be provided to update a map of the affected area.

The safe navigation module 102 can include a control module 112. The control module 112 can generate control data (control data 116) based on a detected change in an environment. For example, in response to detection of a change at a point of interest, control data can be generated to reduce speed of a vehicle. Reducing speed of the vehicle allows time to estimate measurements regarding what was changed and determine a safe route for the vehicle. The control module 112 can generate control data based on estimated measurements of a structure or an object. For example, in response to estimated measurements that a structure or an object does not have sufficient clearance for safe navigation under the structure or the object, control data can be generated to perform a reroute of a vehicle, to perform a safe stop of the vehicle, or to perform a maneuver to avoid navigating under the structure or the object. In response to estimated measurements that a structure or an object has sufficient clearance for safe navigation under the structure or the object, control data can be generated to continue navigation under the structure or the object. In some cases, a vehicle may be attached to a trailer or have cargo on top of the vehicle, increasing the height necessary to safely navigate under a structure or an object. The height of the trailer or the vehicle can be detected or manually entered.

The control module 112 can generate control data based on whether estimated measurements are converging. In response to a determination that estimated measurements are not converging, control data can be generated to perform a reduction in speed to capture more sensor data. In some cases, in response to a determination that estimated measurements are not converging, control data can be generated to perform a reroute a vehicle, to perform a safe stop of the vehicle, or to perform a maneuver to navigate the vehicle away from a point of interest to avoid a potential collision with an overheard obstruction.

In some cases, the control module 112 can provide alerts (e.g., visual, audible, tactile, etc.) to inform a driver or passenger of a vehicle of a detected change in an area to be travelled by the vehicle. For example, in response to a detected change, an alert can be provided to inform a driver that the area has experienced a recent change and to drive with caution when the vehicle is operating in a manual mode of operation. In some cases, the control module 112 can inform a driver of estimated measurements relating to an overhead obstruction. For example, as measurements are estimated, the estimated measurements can be provided to inform a driver of upcoming clearance. If the estimated measurements indicate that there is insufficient clearance for a vehicle to safely navigate, an alert can be provided to inform a driver (or passenger) of the vehicle that the vehicle will automatically take action to avoid the overhead obstruction when the vehicle is operating in an autonomous mode of operation. As another example, in the event of insufficient clearance, an alert can be provided for display to inform a driver to reroute the vehicle or pull over when the vehicle is operating in a manual mode of operation. Many variations are possible.

Figure 2A:
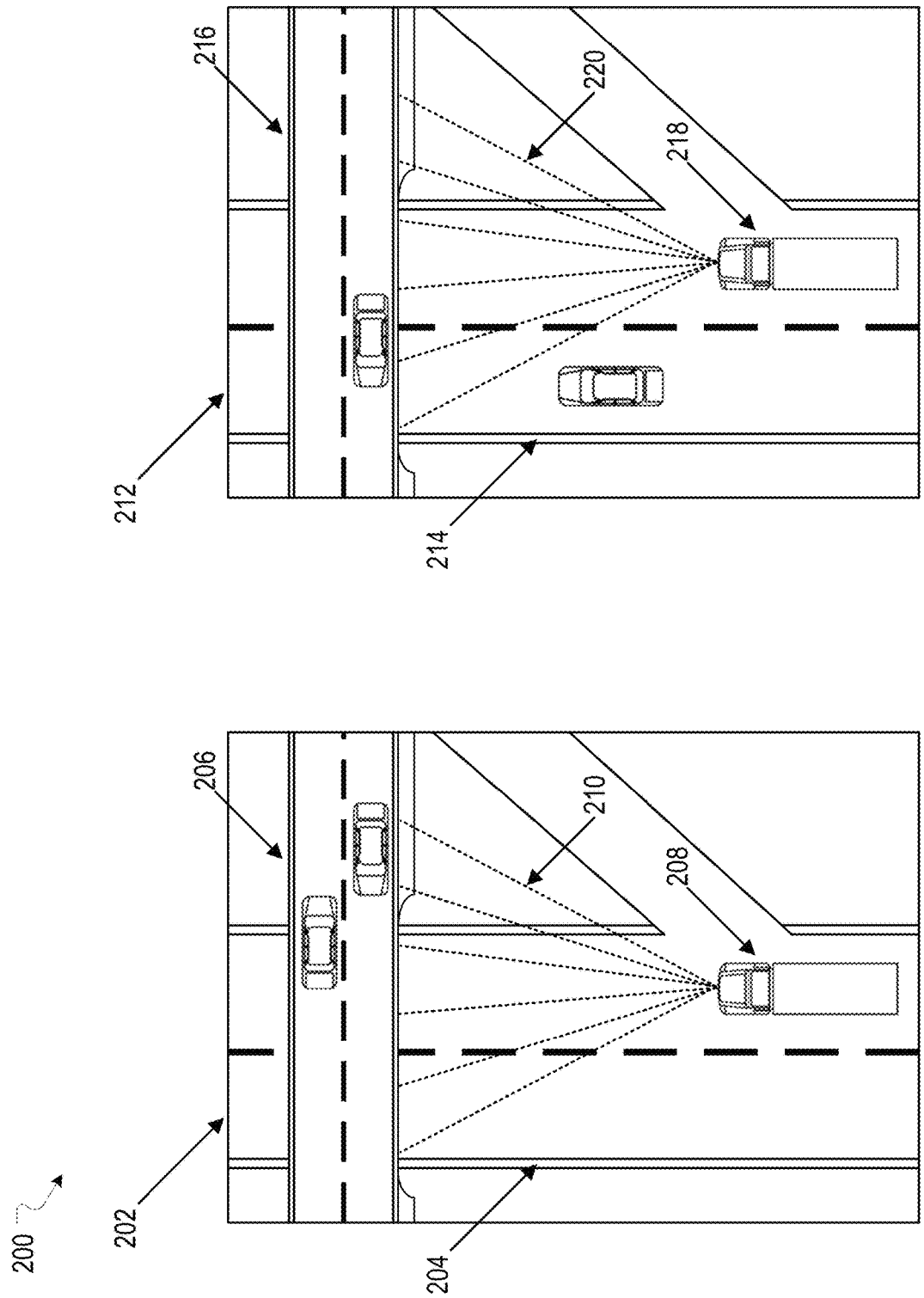
FIGS. 2A-2B illustrate examples associated with mapping and detection in various scenarios, according to embodiments of the present technology.
Figure 2B:
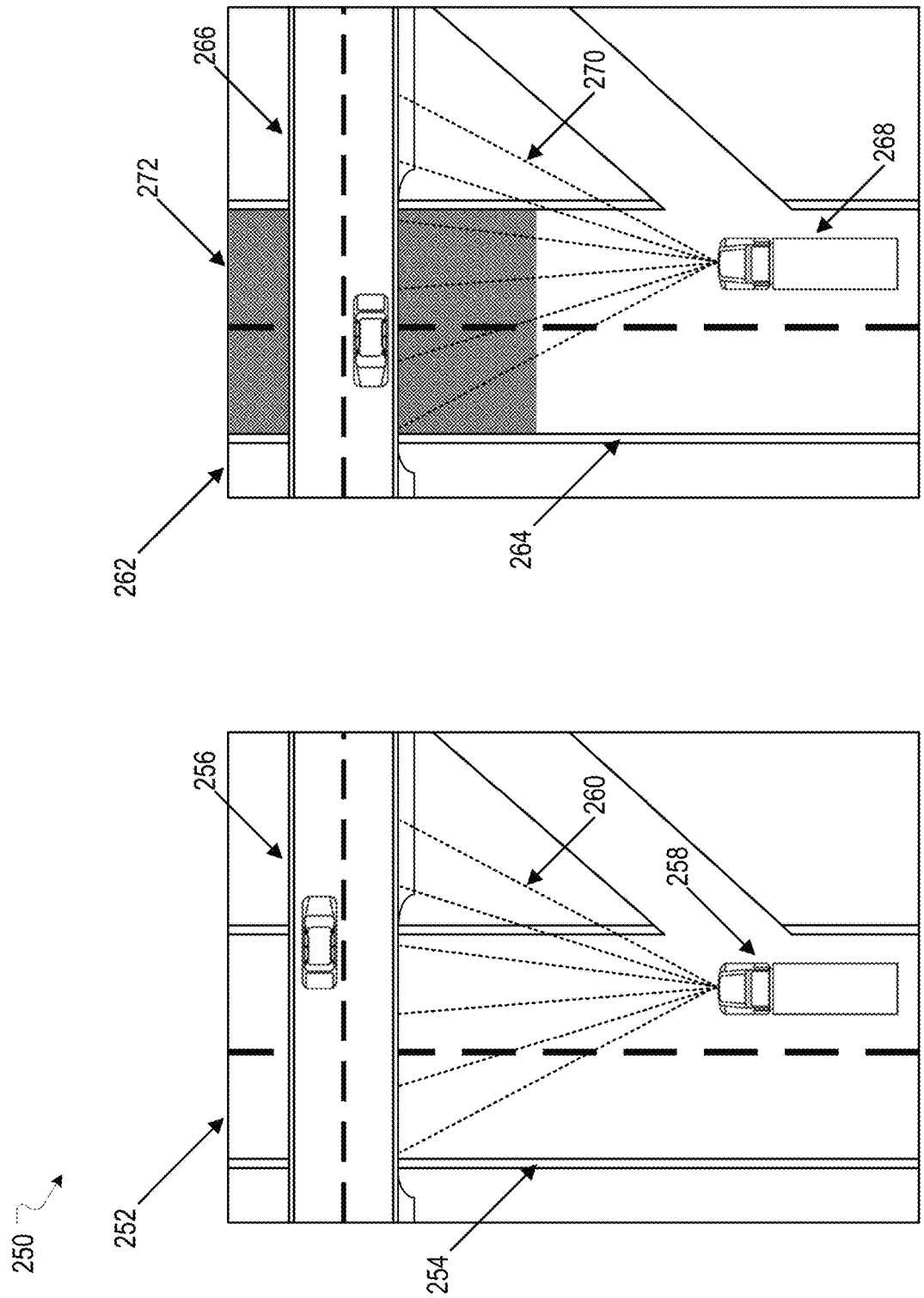

FIGS. 2A-2B illustrate examples associated with mapping and detection in various scenarios, according to some embodiments of the present technology. The various functionality described herein for mapping and detection in various scenarios can be performed by, for example, the safe navigation module 102 of FIG. 1. It should be understood that there can be additional, fewer, or alternative blocks, functionality, or steps performed in similar or alternative orders, or in parallel, based on the various features and embodiments discussed herein unless otherwise stated.

FIG. 2A illustrates an example 200 of using and updating a map with a point of interest. In the example 200, the point of interest includes a highway 204 with an overpass 206. As illustrated in FIG. 2A, a first scenario 202 involving the point of interest includes a first vehicle 208 travelling on the highway 204. The first vehicle 208 approaches the overpass 206 while travelling on the highway 204. As the first vehicle 208 approaches the overpass 206, the first vehicle 208 can capture detection data, including sensor data 210. An autonomous system of the first vehicle 208 can detect changes at the point of interest based on a comparison of the detection data, including sensor data 210, with map data for the point of interest. In this example, no change is detected. The first vehicle 208 safely navigates under the overpass 206. The sensor data 210 captured by the first vehicle 208 can be provided to update the map data for the point of interest. The point of interest in the map data can be updated with additional data based on the sensor data 210. As illustrated in FIG. 2A, a second scenario 212 involving the point of interest includes a second vehicle 218 travelling on the highway 214, which is the same highway as highway 204. The second vehicle 218 approaches the overpass 216, which is the same overpass as overpass 206, while travelling on the highway 214. As the second vehicle 218 approaches the overpass 216, the second vehicle 218 can capture detection data, including sensor data 220. An autonomous system of the second vehicle 218 can detect changes at the point of interest based on a comparison of the detection data, including sensor data 220, with map data for the point of interest, which has been updated with the sensor data 210 captured by the first vehicle 208. In this example, no change is detected. The second vehicle 218 safely navigates under the overpass 216. The sensor data 220 captured by the second vehicle 218 can be provided to update the map data for the point of interest. The map data associated with the point of interest can be updated with additional data based on the sensor data 220. Many variations are possible.

FIG. 2B illustrates an example 250 of using and updating a map with a point of interest. In the example 250, the point of interest includes a highway 254 with an overpass 256. As illustrated in FIG. 2B, a first scenario 252 involving the point of interest includes a first vehicle 258 travelling on the highway 254. The first vehicle 258 approaches the overpass 256 while travelling on the highway 254. As the first vehicle 258 approaches the overpass 256, the first vehicle 258 can capture detection data, including sensor data 260. An autonomous system of the first vehicle 258 can detect changes at the point of interest based on a comparison of the detection data, including sensor data 260, with map data for the point of interest. In this example, no change is detected. The first vehicle 258 safely navigates under the overpass 256. The sensor data 260 captured by the first vehicle 258 can be provided to update the map data for the point of interest. The map data associated with the point of interest can be updated with additional data based on the sensor data 260. As illustrated in FIG. 2B, a second scenario 262 involving the point of interest includes a second vehicle 268 travelling on a highway 264, which is the same highway as highway 254. The second vehicle 268 approaches an overpass 266, which is the same overpass as overpass 256, while travelling on the highway 264. As the second vehicle 268 approaches the overpass 266, the second vehicle 268 can capture detection data, including sensor data 270. An autonomous system of the second vehicle 268 can detect changes at the point of interest based on a comparison of the detection data, including sensor data 270, with map data for the point of interest, which has been updated with the sensor data 260 captured by the first vehicle 258. In this example, the highway 264 has been paved and there is a paved section 272 under the overpass 266. The paved section 272 may have an increased height, thus reducing the clearance of the overpass 266. Based on the detected change, the autonomous system of the second vehicle 268 can estimate a clearance under the overpass 266 to determine whether the second vehicle 268 can safely navigate under the overpass 266. If the clearance under the overpass 266 is insufficient to safely navigate the second vehicle 268 under the overpass 266, the autonomous system of the second vehicle 268 can control the second vehicle 268 to exit the highway 264 by, for example, proceeding along a highway off-ramp or take other action to avoid the overpass 266. Many variations are possible.

Figure 3:
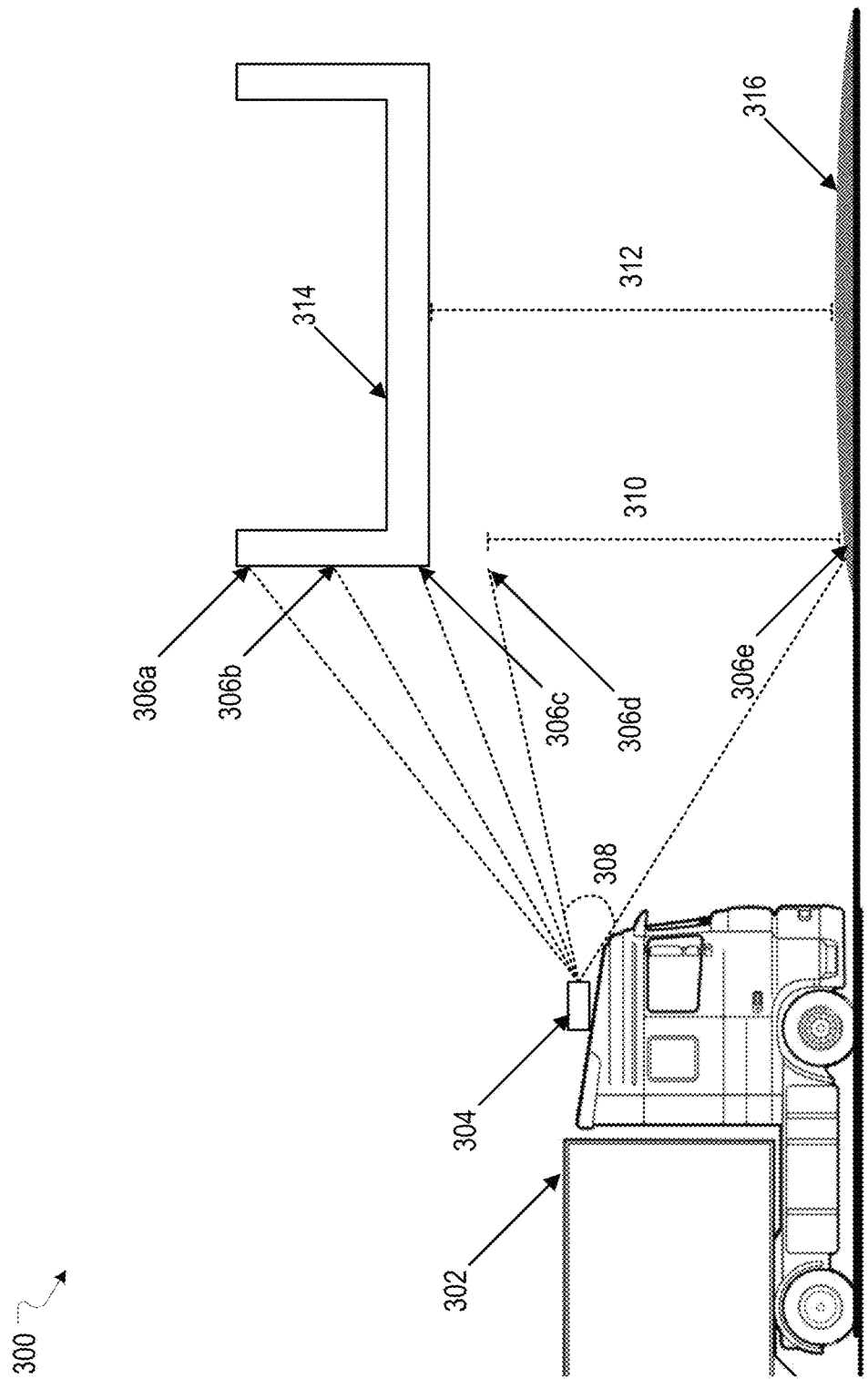
FIG. 3 illustrates an example associated with mapping and detection for safe navigation, according to embodiments of the present technology.

FIG. 3 illustrates an example 300 associated with mapping and detection, according to some embodiments of the present technology. The various functionality described herein for mapping and detection can be performed by, for example, the safe navigation module 102 of FIG. 1. It should be understood that there can be additional, fewer, or alternative functionality or steps performed in similar or alternative orders, or in parallel, based on the various features and embodiments discussed herein unless otherwise stated.

As illustrated in FIG. 3, an autonomous system of a vehicle 302 can estimate clearance 312 under a bridge 314. The clearance 312 under the bridge 314 has been reduced due to the paving 316 on the road surface below the bridge 314. The vehicle 302 includes a sensor array 304, which in this example includes a LiDAR sensor. The LiDAR sensor transmits various lasers that reflect at points 306a, 306b, 306c on the bridge 314, and at point 306e on the paving 316. In this example, the point 306c is above the bottom edge of the bridge 314. To make a safe estimate, point 306d, which corresponds with a transmitted laser that was not reflected, is used as a point on the bottom edge of the bridge 314. The clearance 312 under the bridge 314 can be estimated by determining a height 310 between point 306d and point 306e. The height 310 can be determined based on a distance between the LiDAR sensor and point 306d, a distance between the LiDAR sensor and point 306e, and an angle 308 between point 306d and point 306e. As illustrated in this example, the LiDAR sensor in the sensor array 304, point 306d, and point 306e form a triangle that allows height 310 to be determined based on the distance between the LiDAR sensor and point 306d, the distance between the LiDAR sensor and point 306e, and the angle 308 between point 306d the point 306. It should be understood from this example that using point 306d to estimate clearance 312 facilitates a safer estimate than using point 306c because point 306c is above the bottom edge of the bridge 314. Using point 306c would result in a determination of a height that is higher than clearance 312 and potentially result in an incorrect determination of whether the vehicle 302 can safely navigate under the bridge. It should be understood that, as the vehicle 302 approaches the bridge 314, sensor data captured by the sensor array 304 can be more precise. As the sensor data becomes more precise, the estimation of the clearance can converge to an accurate value. Many variations are possible.

Figure 4A:
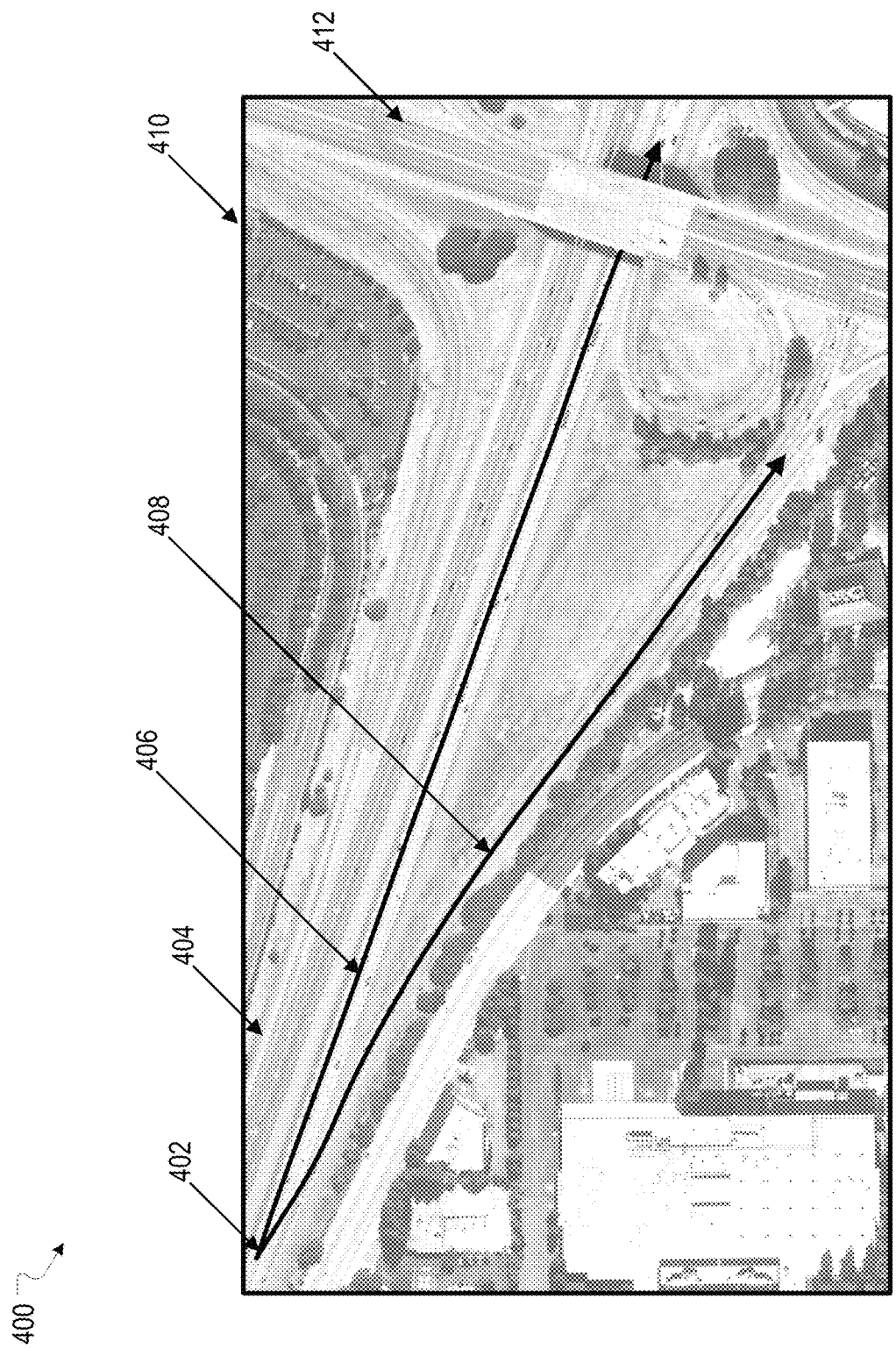
FIGS. 4A-4C illustrate example associated with mapping and detection in various scenarios, according to embodiments of the present technology.
Figure 4B:
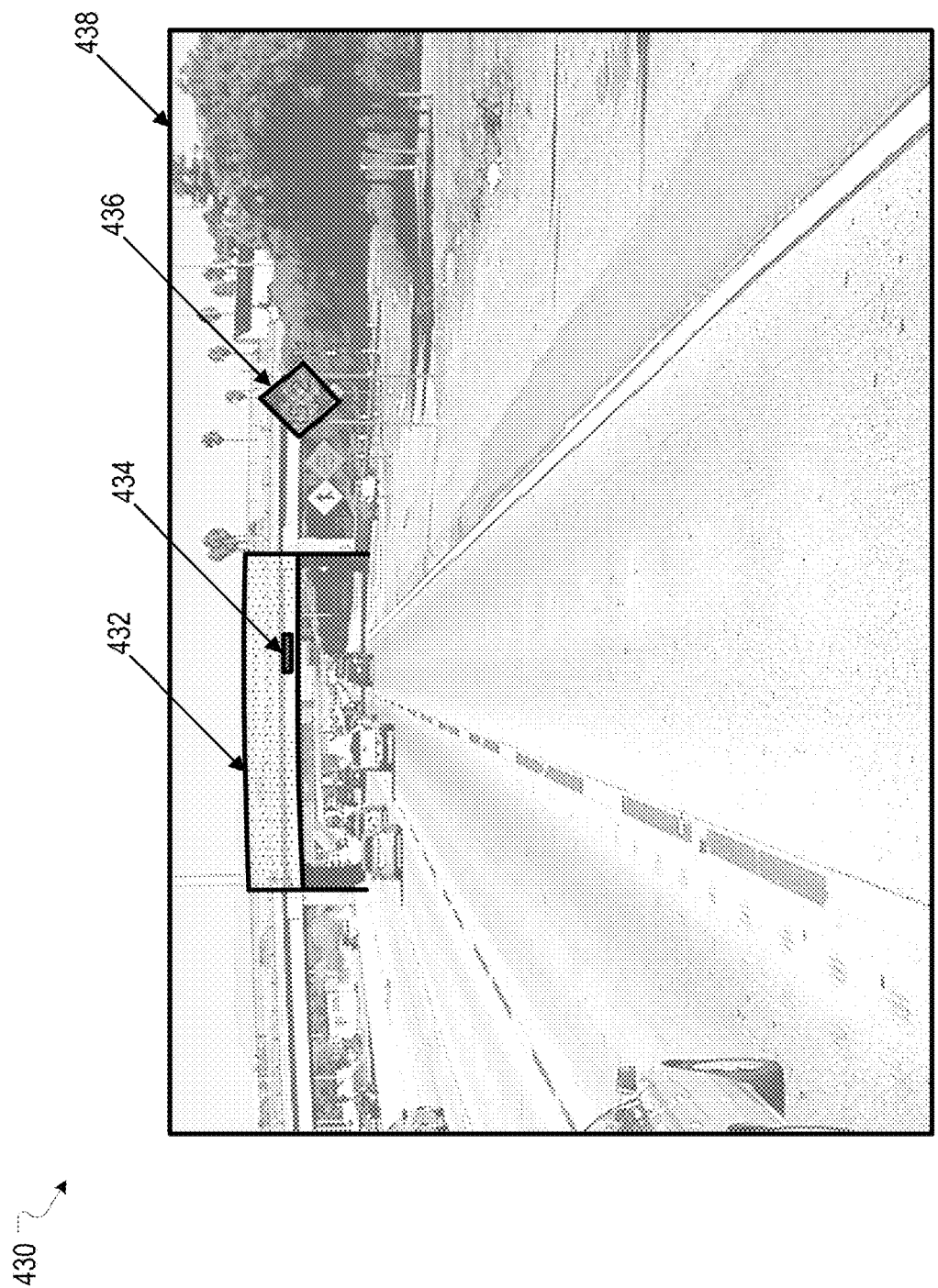
Figure 4C:
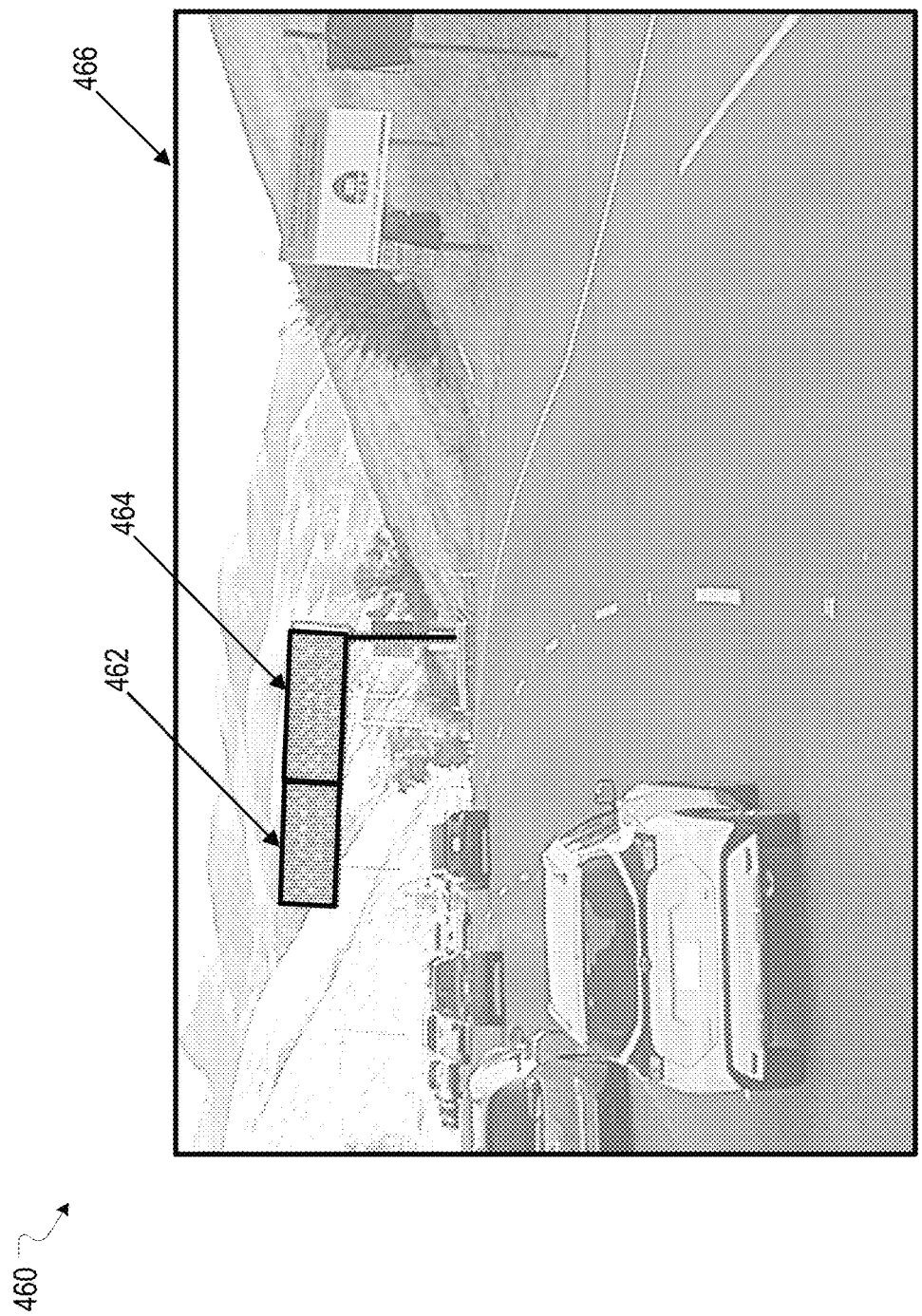

FIGS. 4A-4C illustrate examples associated with mapping and detection in various scenarios, according to some embodiments of the present technology. The various functionality described herein for mapping and detection in various scenarios can be performed by, for example, the safe navigation module 102 of FIG. 1. It should be understood that there can be additional, fewer, or alternative blocks, functionality, or steps performed in similar or alternative orders, or in parallel, based on the various features and embodiments discussed herein unless otherwise stated.

FIG. 4A illustrates an example 400 of rerouting based on a detected change and estimated measurements of a point of interest. As illustrated in this example, a point of interest 410 includes a highway 404 with an overpass 412. A vehicle 402 can be travelling on the highway 404 with a planned route 406. As the vehicle 402 approaches the overpass 412, an autonomous system of the vehicle 402 can detect a change in the point of interest 410 based on detection data for the point of interest and map data for the point of interest. In this example, the autonomous system of the vehicle 402 can detect a change based on the comparison. The autonomous system of the vehicle 402 can estimate measurements of the point of interest, including clearance under the overpass 412. Based on the estimated measurements of the point of interest, the autonomous system of the vehicle 402 can determine whether to continue on the planned route 406 or to avoid the overpass 412 by travelling on an alternate route 408. In this example, the autonomous system of the vehicle 402 can determine the estimated clearance under the overpass 412 is insufficient for the vehicle 402 to safely navigate under the overpass 412. Accordingly, the autonomous system of the vehicle 402 can control the vehicle 402 to take the alternate route 408. Many variations are possible.

FIG. 4B illustrates an example 430 of a point of interest 438. As illustrated in this example, the point of interest 438 includes a highway with an overpass 432. Map data for the point of interest 438 can include information about the point of interest 438 at a higher level of detail than other areas in the map data. For example, a high density point cloud of a section of the overpass 432 can be included in the map data for the point of interest 438. Semantic information including recognized text on sign 434 and sign 436 can be included in the map data. Inclusion of information, such as those described, in the map data for the point of interest 438 can allow for changes in the point of interest 438 to be more readily detected. As a result, determinations about sufficiency of clearance relating to overhead obstructions can be more accurate, improving safe navigation of vehicles.

FIG. 4C illustrates an example 460 of a point of interest 466. As illustrated in this example, the point of interest 466 includes a highway with overpass signs 462, 464. Map data for the point of interest 466 can include information for the point of interest 466 at a higher level of detail than other areas in the map data. For example, a high density point cloud of overpass sign 462 can be included in the map data for the point of interest 466. As another example, a high density point cloud of overpass sign 464 can be included in the map data for the point of interest 466. Semantic information including recognized text on overpass sign 462 and overpass sign 466 can be included in the map data. Inclusion of such information in the map data for the point of interest 466 can allow for changes in the point of interest 466 to be more readily detected and accordingly can optimize safe navigation through environments with overhead obstructions.

Figure 5:
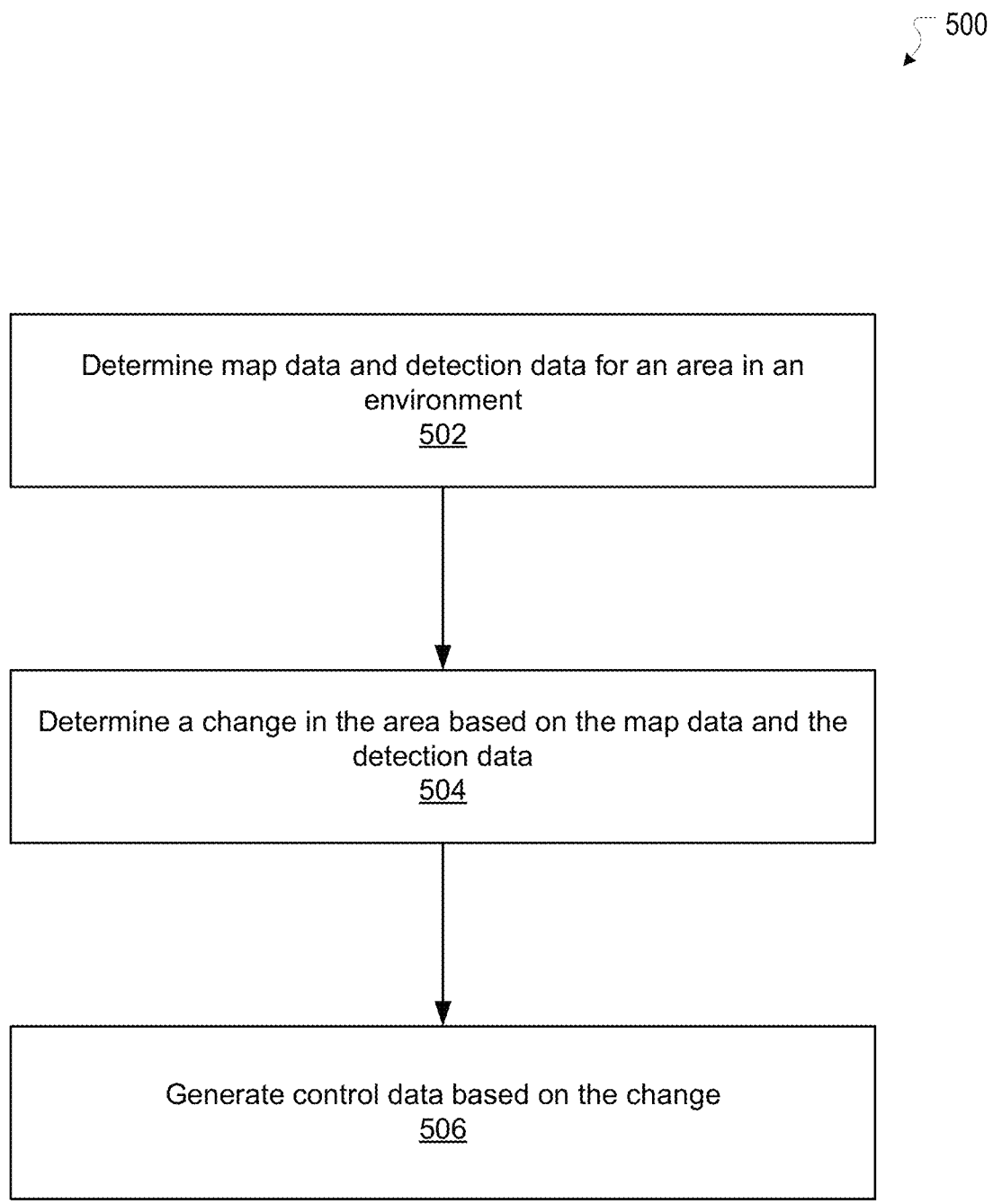
FIG. 5 illustrates an example method, according to embodiments of the present technology.

FIG. 5 illustrates an example method 500, according to embodiments of the present technology. At block 502, the example method 500 determines map data and detection data for an area in an environment. At block 504, the example method 500 determines a change in the area based on the map data and the detection data. At block 506, the example method 500 generates control data based on the change. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
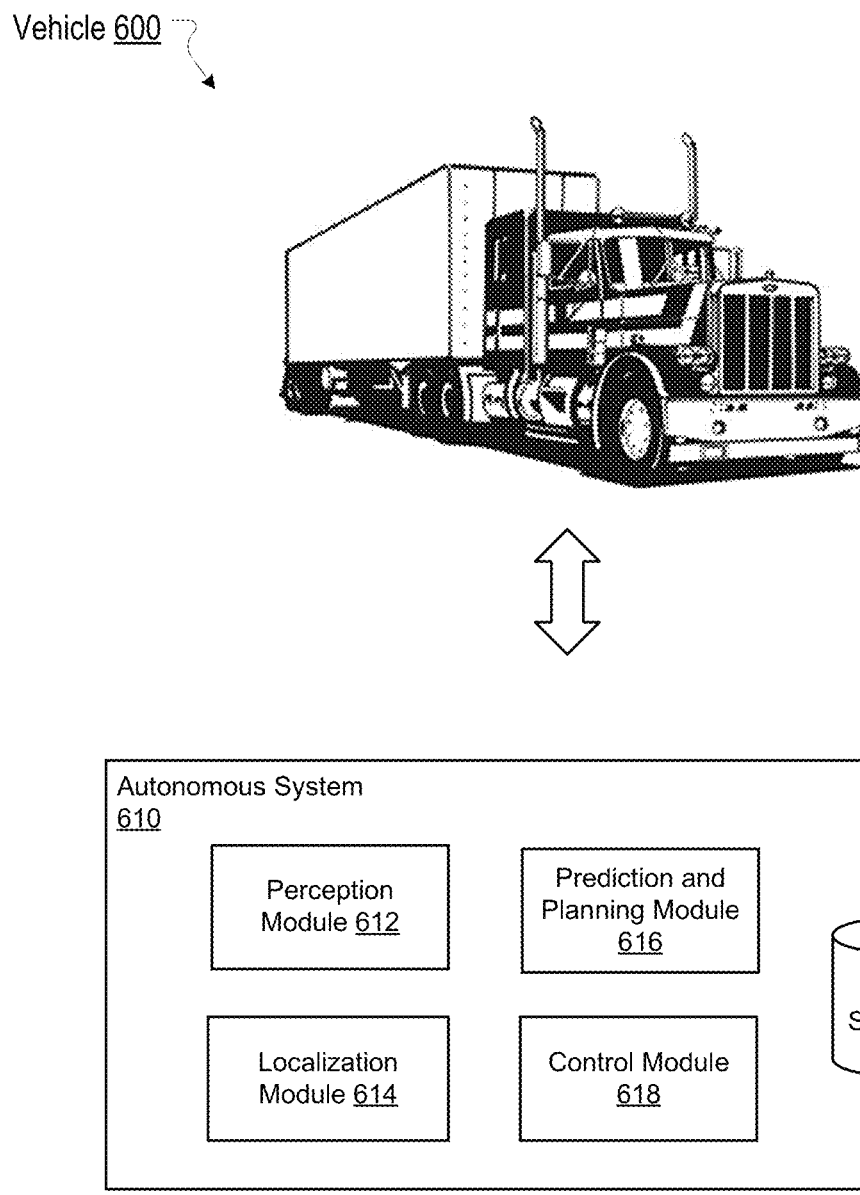
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is travelling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular.

In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
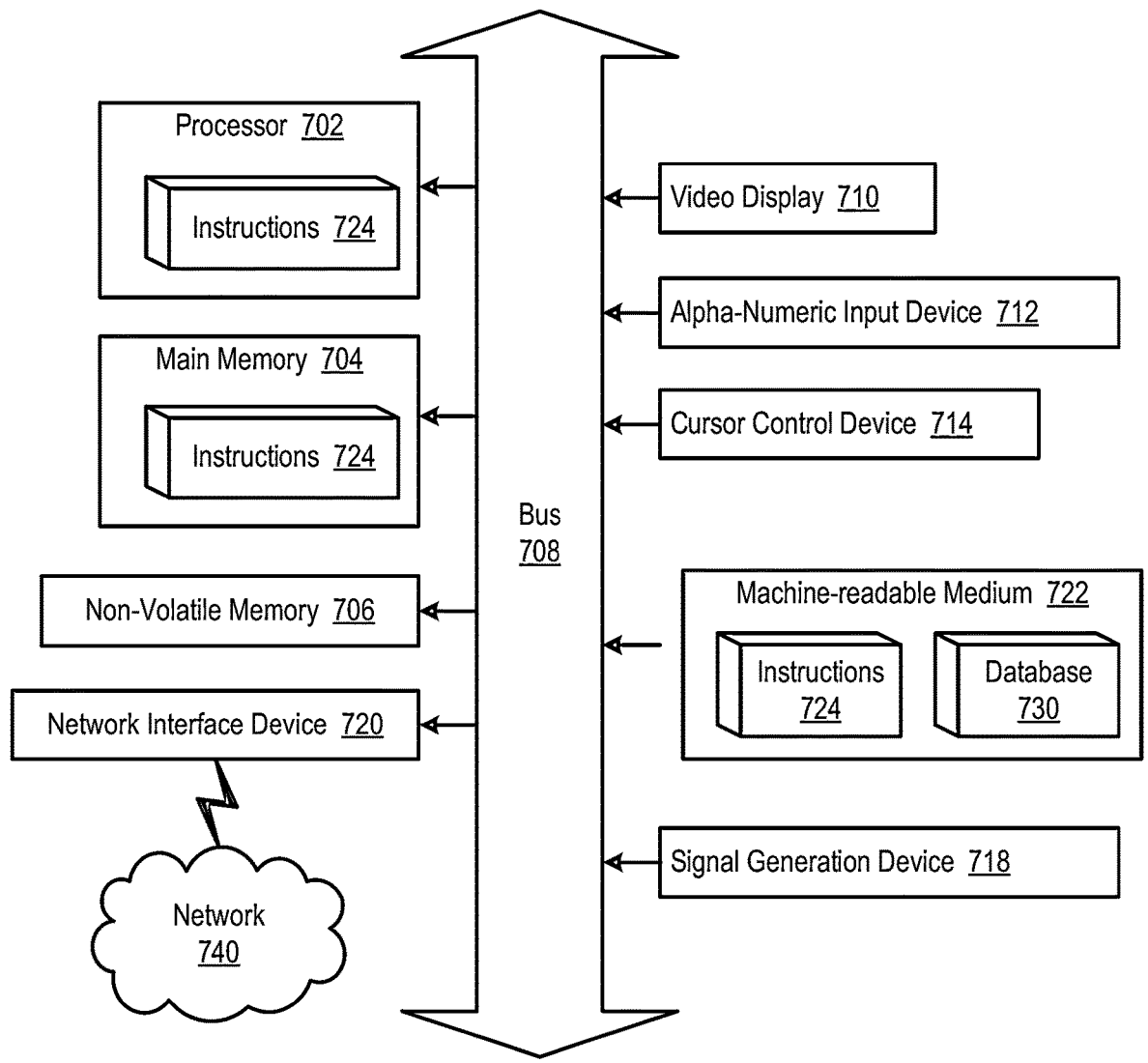
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 922 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a computing system, map data and detection data for an area in an environment of a vehicle;
   determining, by the computing system, an edge of a structure in the area based on visual data for the structure;
   determining, by the computing system, a first point on the edge of the structure based on a point in a point cloud associated with the structure, wherein the point is within a threshold distance of the edge;
   estimating, by the computing system, based on the detection data, an estimated vertical clearance of the structure in the area based on a first distance between the vehicle and the first point on the edge of the structure, a second distance between the vehicle and a second point on a road surface in the area, and an angle associated with the first point and the second point;
   determining, by the computing system, a change to a vertical clearance of the structure in the area based on the map data and the estimated vertical clearance; and
   generating, by the computing system, control data to control the vehicle based on the change to the vertical clearance.

2. The computer-implemented method of claim 1, further comprising:
   estimating, by the computing system, measurements for the structure in the area based on the detection data, wherein the control data is based on the measurements for the structure or the object.

3. The computer-implemented method of claim 2, wherein the estimating the measurements for the structure comprises:
   determining, by the computing system, edges of the structure based on visual data for the structure; and
   determining, by the computing system, a distance between the edges of the structure based on depth data for the structure.

4. The computer-implemented method of claim 1, further comprising:
   projecting, by the computing system, the map data over the detection data; and
   comparing, by the computing system, the map data and the detection data, wherein the change in the area is determined based on the comparing.

5. The computer-implemented method of claim 1, further comprising:
   providing, by the computing system, the detection data for the area, wherein the map data for the area is updated based on the detection data.

6. The computer-implemented method of claim 1, wherein the point in the point cloud is outside the structure.

7. The computer-implemented method of claim 1, further comprising:
   providing, by the computing system, an alert based on the change in the area.

8. The computer-implemented method of claim 1, further comprising:
   determining, by the computing system, whether estimated measurements for the structure in the environment are converging to a value, wherein the control data is generated based on whether the estimated measurements are converging.

9. The computer-implemented method of claim 1, wherein the map data includes at least one of: a three-dimensional (3D) reconstruction of the area, a point cloud of the area, images of the area, and semantic information for the area.

10. The computer-implemented method of claim 1, wherein the control data includes data to perform at least one of: a reroute of the vehicle, a safe stop of the vehicle, a maneuver to avoid navigation under the structure, a reduction in speed, and a maneuver to navigate the vehicle away from a point of interest.

11. A system comprising:
   at least one processor; and
   a memory storing instructions that, when executed by the at least one processor, cause the system to perform operations comprising:
      determining map data and detection data for an area in an environment of a vehicle;
      determining an edge of a structure in the area based on visual data for the structure;
      determining a first point on the edge of the structure based on a point in a point cloud associated with the structure, wherein the point is within a threshold distance of the edge;
      estimating based on the detection data, an estimated vertical clearance of the structure in the area based on a first distance between the vehicle and the first point on the edge of the structure, a second distance between the vehicle and a second point on a road surface in the area, and an angle associated with the first point and the second point;
      determining a change to a vertical clearance of the structure in the area based on the map data and the estimated vertical clearance; and
      generating control data to control the vehicle based on the change to the vertical clearance.

12. The system of claim 11, the operations further comprising:
   estimating measurements for the structure in the area based on the detection data, wherein the control data is based on the measurements for the structure or the object.

13. The system of claim 12, wherein the estimating the measurements for the structure comprises:
   determining edges of the structure based on visual data for the structure; and
   determining a distance between the edges of the structure based on depth data for the structure.

14. The system of claim 11, the operations further comprising:
   projecting the map data over the detection data; and
   comparing the map data and the detection data, wherein the change in the area is determined based on the comparing.

15. The system of claim 11, the operations further comprising:
   providing the detection data for the area, wherein the map data for the area is updated based on the detection data.

16. A non-transitory computer-readable storage medium including instructions that, when executed by at least one processor of a computing system, cause the computing system to perform operations comprising:
   determining map data and detection data for an area in an environment of a vehicle;
   determining an edge of a structure in the area based on visual data for the structure;
   determining a first point on the edge of the structure based on a point in a point cloud associated with the structure, wherein the point is within a threshold distance of the edge;
   estimating based on the detection data, an estimated vertical clearance of the structure in the area based on a first distance between the vehicle and the first point on the edge of the structure, a second distance between the vehicle and a second point on a road surface in the area, and an angle associated with the first point and the second point;
   determining a change to a vertical clearance of the structure in the area based on the map data and the estimated vertical clearance; and
   generating control data to control the vehicle based on the change to the vertical clearance.

17. The non-transitory computer-readable storage medium of claim 16, the operations further comprising:
   estimating measurements for the structure in the area based on the detection data, wherein the control data is based on the measurements for the structure or the object.

18. The non-transitory computer-readable storage medium of claim 17, wherein the estimating the measurements for the structure comprises:
   determining edges of the structure based on visual data for the structure; and
   determining a distance between the edges of the structure based on depth data for the structure.

19. The non-transitory computer-readable storage medium of claim 16, the operations further comprising:
   projecting the map data over the detection data; and comparing the map data and the detection data, wherein the change in the area is determined based on the comparing.

20. The non-transitory computer-readable storage medium of claim 16, the operations further comprising:
providing the detection data for the area, wherein the map data for the area is updated based on the detection data.

\* \* \* \* \*